United States Patent
Naruse et al.

(10) Patent No.: US 8,441,225 B2
(45) Date of Patent: May 14, 2013

(54) DIRECT-CURRENT TO THREE-PHASE ALTERNATING-CURRENT INVERTER SYSTEM

(75) Inventors: Takuya Naruse, Aichi-ken (JP); Kazuki Najima, Aichi-ken (JP)

(73) Assignee: Kabushiki Kaisha Toyota Jidoshokki, Aichi (JP)

( * ) Notice: Subject to any disclaimer, the term of this patent is extended or adjusted under 35 U.S.C. 154(b) by 233 days.

(21) Appl. No.: 13/075,982

(22) Filed: Mar. 30, 2011

(65) Prior Publication Data
US 2011/0241585 A1 Oct. 6, 2011

(30) Foreign Application Priority Data
Mar. 31, 2010 (JP) ................................. 2010-082611

(51) Int. Cl.
*H02P 27/04* (2006.01)
(52) U.S. Cl.
USPC ........... 318/801; 318/727; 318/761; 318/798; 318/799; 318/800
(58) Field of Classification Search .................. 318/727, 318/761, 798, 799, 800, 801
See application file for complete search history.

(56) References Cited

U.S. PATENT DOCUMENTS

| 7,202,618 B2 * | 4/2007 | Ide et al. | 318/400.12 |
| 2009/0237019 A1 * | 9/2009 | Yamakawa et al. | 318/400.09 |
| 2011/0006723 A1 * | 1/2011 | Yamakawa et al. | 318/812 |

FOREIGN PATENT DOCUMENTS

| JP | 10-337047 A | 12/1998 |
| JP | 2002-272183 A | 9/2002 |
| JP | 2005-269722 A | 9/2005 |
| JP | 2007-274880 A | 10/2007 |
| JP | 2008-206293 A | 9/2008 |
| JP | 2008-259314 A | 10/2008 |

* cited by examiner

*Primary Examiner* — Kawing Chan
(74) *Attorney, Agent, or Firm* — Sughrue Mion, PLLC

(57) ABSTRACT

A DC to three-phase AC inverter system includes a three-phase motor, an inverter circuit, switching elements, a capacitor, a DC power source and a control circuit. The DC power source is connected to the three-phase motor at a neutral point thereof. The control circuit calculates voltage commands, first through third divided boost commands by dividing a boost command, and first through third drive signals based on the voltage commands and the first through third divided boost commands. The second and third divided boost commands are used when the PWM control is performed by turning on and off the switching elements for the second and third phases while the switching elements for the first phase continues to be on or off state is set larger than those used when the PWM control is performed by turning on and off the switching elements for the first through third phases.

2 Claims, 3 Drawing Sheets

DIRECT-CURRENT TO THREE-PHASE ALTERNATING-CURRENT INVERTER SYSTEM

BACKGROUND OF THE INVENTION

The present invention relates to a direct-current to three-phase alternating-current inverter system (hereinafter referred to as "DC to three-phase AC inverter system") in which a direct-current power source (hereinafter referred to as "DC power source") is connected to a three-phase motor at a neutral-point thereof.

When the direct-current voltage (hereinafter referred to as "DC voltage") is decreased in an inverter circuit for a three-phase motor, the inverter circuit requires a large current for obtaining the same output voltage as that outputted before the DC voltage is decreased. To meet this requirement, a switching element having a high current rating or a booster circuit may be arranged in the inverter circuit. If such measures are taken, the size of the switching element is increased, and a booster circuit is required to be added to the inverter circuit, so that the size of the inverter circuit becomes large thereby to increase the cost of the inverter circuit.

In order to solve the problem, a DC to three-phase AC inverter is proposed, for example, by Japanese Patent Application Publication No. 10-337047, in which the voltage of the DC power source connected to the neutral-point of the three-phase motor is boosted thereby to charge the capacitor, and the DC power of the capacitor is converted into the three-phase AC power to be supplied to the three-phase motor. In the DC to three-phase AC inverter system disclosed in the above Publication, both of the inverter operation and the boost operation may be accomplished by performing the boost operation in the region of the zero-voltage vector of the inverter operation. Thus, a large-sized switching element for large current application is not required for the inverter circuit. In the DC to three-phase AC inverter system, the zero-phase inductance of the three-phase motor may serve as a reactor for the boost operation, so that a booster circuit is not required to be added in the DC to three-phase AC inverter system other than the inverter circuit.

In the above-described DC to three-phase AC inverter system, if the voltage is not enough for driving the three-phase motor with the boost voltage ratio two or less, the inverter operation is performed through the overmodulation pulse width modulation control (hereinafter referred to as "PWM control") when the amplitude of the voltage command becomes larger than that of the voltage of the capacitor. Referring to FIG. 3, in the overmodulation region T1, the drive signal S1 for the switching element of the upper arm for the U-phase continues to be in a high level, and the switching element of the upper arm for the U-phase continues to be on when the inverter operation is performed through the overmodulation PWM control. In the overmodulation region T2, the drive signal S1 continues to be in a low level and the switching element of the U-phase upper arm continues to be off. In the overmodulation region T1, where the switching element of the lower arm for the U-phase is not on, energy is not charged in the inductance of the three-phase motor, so that the boost operation cannot be performed. In the overmodulation region T2, where the switching element of the upper arm for the U-phase is not on, the energy stored in the inductance of the three-phase motor is not discharged to the capacitor, so that the boost operation is not performed. The same is true of the V-phase and the W-phase. In the above DC to three-phase AC inverter system, when the inverter operation is performed through the overmodulation PWM control, the boost operation may fail to be performed, with the result the operation of the three-phase motor is performed in the limited range.

The present invention is directed to providing a DC to three-phase AC inverter system in which a DC power source is connected to a three-phase motor at a neutral-point thereof and which prevents that the operation of three-phase motor is performed in a limited range when the inverter operation of the inverter system is performed through the overmodulation PWM control.

SUMMARY OF THE INVENTION

Other aspects and advantages of the invention will become apparent from the following description, taken in conjunction with the accompanying drawings, illustrating by way of example the principles of the invention.

A direct-current to three-phase alternating-current inverter system includes a three-phase motor, an inverter circuit, a plurality of switching elements, a capacitor, a direct-current power source and a control circuit. The three-phase motor has first through third phases. The inverter circuit used for the three-phase motor. The switching elements are arranged in the inverter circuit. Each switching element performs switching operation. The switching elements respectively serving as upper arms and lower arms for the respective three phases of the three-phase motor. The capacitor is connected in parallel to the respective pairs of the upper arm and the lower arm. The direct-current power source is arranged between the neutral-point of the three-phase motor and the respective upper arms or the respective lower arms. The control circuit calculates voltage commands for driving the three-phase motor, first through third divided boost commands by dividing a boost command for making voltage of the capacitor a predetermined value and first through third drive signals based on the voltage commands and the first through third divided boost commands for controlling the switching operation of the switching elements for the first through third phases. The second and third divided boost commands used when the pulse width modulation control is performed by turning on and off the switching elements for the second and third phases while the switching elements for the first phase continues to be on or off is set larger than the second and third divided boost commands used when the pulse width modulation control is performed by turning on and off the switching elements for the first through third phases.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE PREFERRED EMBODIMENTS

Figure 1:
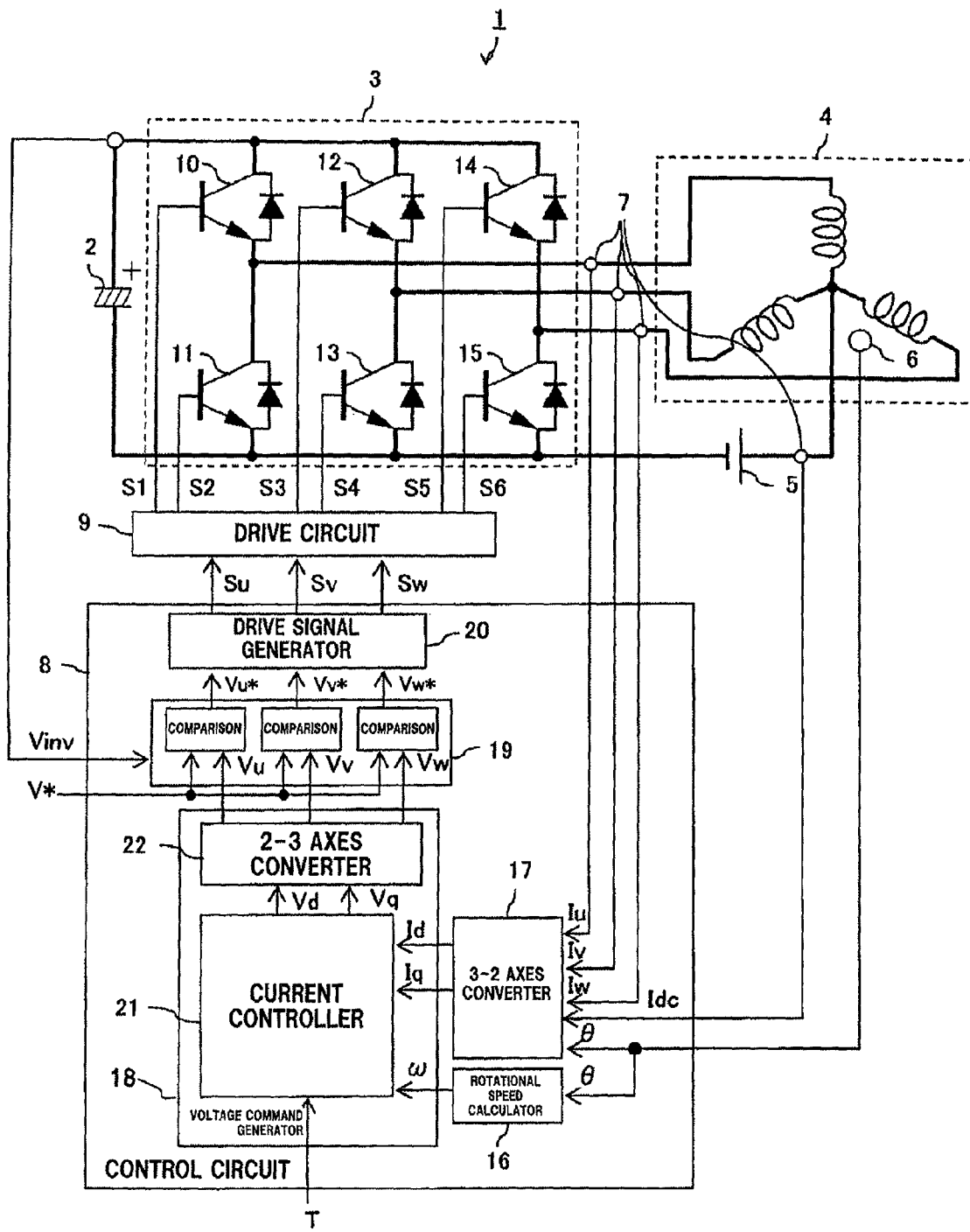
FIG. 1 is a circuit diagram showing a DC to three-phase AC inverter system according to a preferred embodiment of the present invention.
Figure 2:
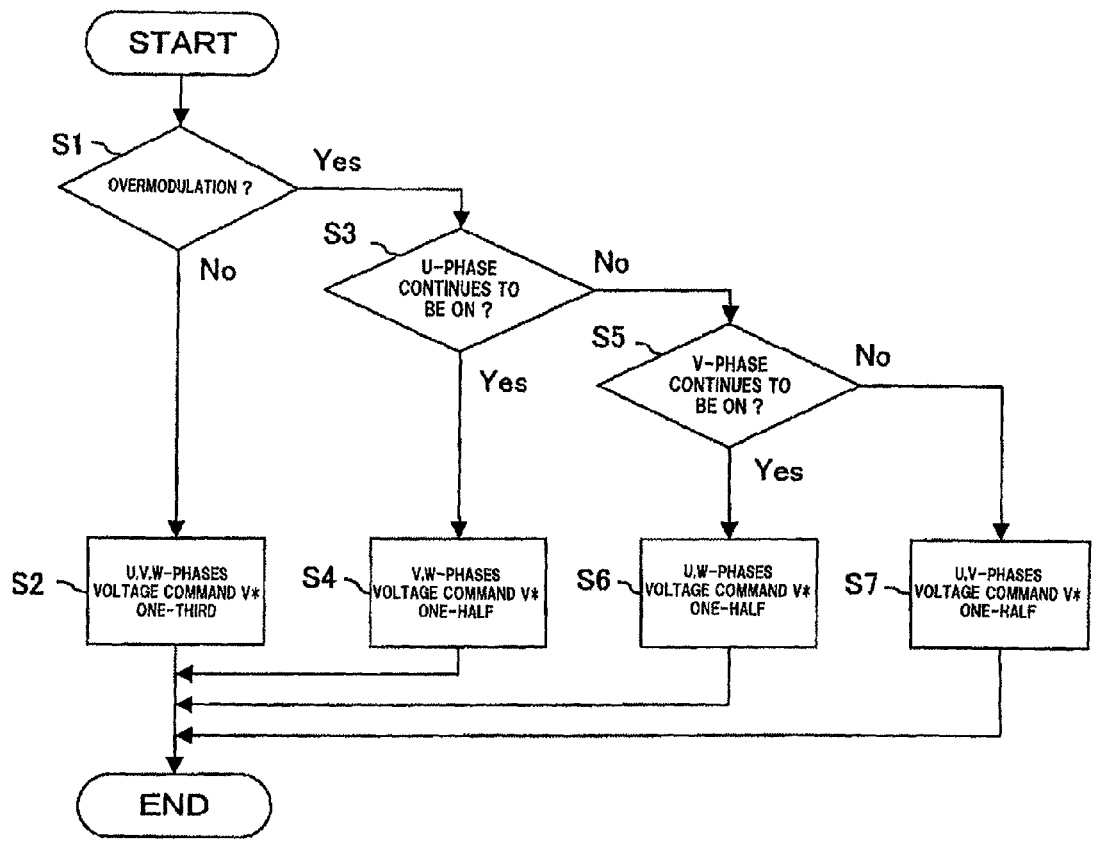
FIG. 2 is a flow chart showing an operation of a comparing element of the DC to three-phase AC inverter system of FIG. 1.
Figure 3:
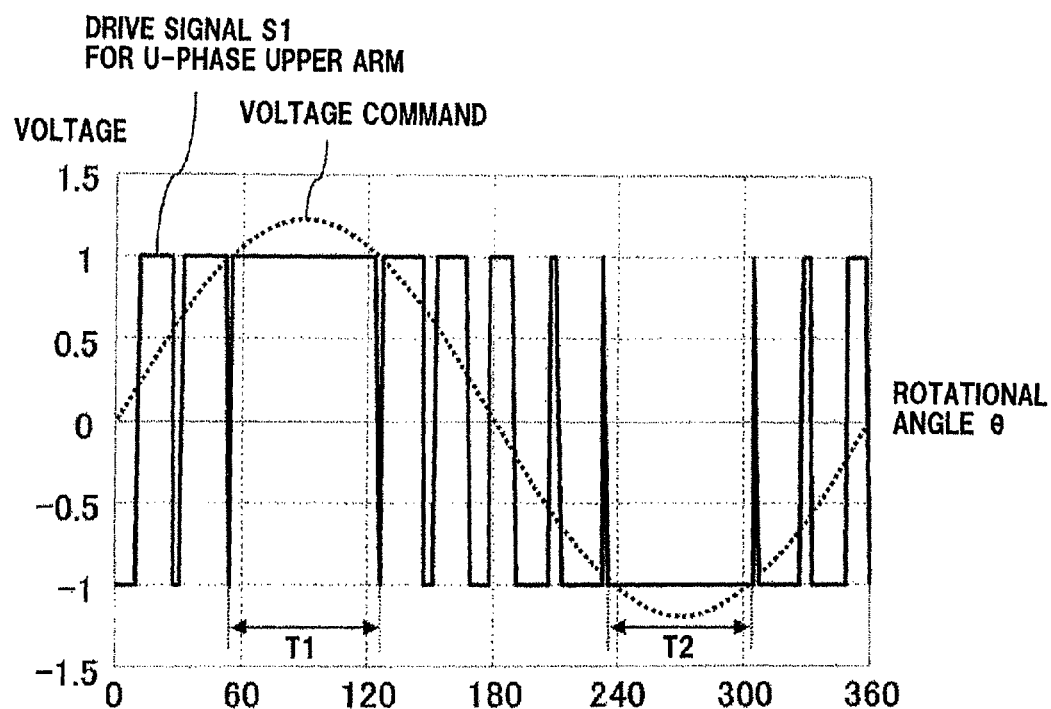
FIG. 3 is a waveform diagram showing drive signals for a switching element of a U-phase upper arm when inverter operation is performed through the overmodulation PWM control according to the DC to three-phase AC inverter system of FIG. 1.

The following will describe a DC to three-phase AC inverter system according to a preferred embodiment of the present invention with reference to FIGS. 1 through 3. The DC to three-phase AC inverter system is designated generally by reference numeral 1, including a capacitor 2, an inverter circuit 3, a three-phase motor 4 such as the one for a compressor, a DC power source 5, a rotation angle sensor 6, such as a resolver or an encoder, a current sensor 7, a control circuit 8 such as central processing unit (CPU) and a drive circuit 9. The DC to three-phase AC inverter system 1 may dispense with the rotation angle sensor 6, and it may be so arranged that the rotation angle is determined by calculation, that is "sensorless controlled".

The inverter circuit 3 for the three-phase motor 4 having three phases of U-phase, V-phase and WW phase includes six switching elements 10 through 15, such as a metal-oxide semiconductor field-effect transistor (MOSFET) or a bipolar transistor with which a diode is connected in parallel. The switching elements 10, 11 are connected in series to each other and respectively serve as the upper and lower arms for the U-phase of the three-phase motor 4. The switching elements 12, 13 are connected in series to each other and respectively serve as the upper and lower arms for the V-phase of the three-phase motor 4. The switching elements 14, 15 are connected in series to each other and respectively serve as the upper and lower arms for the W-phase of the three-phase motor 4. The pairs of the switching elements 10, 11, the switching elements 12, 13 and the switching elements 14, 15 are connected in parallel to one another and connected to the capacitor 2. In other words, the capacitor 2 is connected in parallel to the respective pairs of the switching elements 10, 11, the switching elements 12, 13 and the switching elements 14, 15. The low voltage terminals of the switching elements 11, 13, 15 serving as the lower arms for the respective phases are connected to the negative terminal of the DC power source 5, and the positive terminal of the DC power source 5 is connected to the neutral-point of the three-phase motor 4.

When the respective switching elements 10 through 15 are turned on and off according to drive signals S1 through S6 from the drive circuit 9, the DC power from the capacitor 2 is converted to the three-phase AC power in which the three phases are shifted by 120 degrees from one another, and then the three-phase AC power is supplied to and drive the three-phase motor 4.

When a current is flowing at the neutral-point of the three-phase motor 4 in the same direction as the discharging direction of the DC power of the DC power source 5 and any one of the switching elements 11, 13, 15 serving as the lower arm for one phase is turned on, energy from the DC power source 5 is stored in the reactor of the three-phase motor 4 that is connected to the switching element of the lower arm in ON state. Then, when the switching element of the lower arm in ON state is turned off, the energy stored in the reactor is supplied to the capacitor 2 through the switching element of the upper arm paired with the switching element of the lower arm in OFF state and stored in the capacitor 2. Thus, the three-phase motor 4 is driven by three-phase AC power supplied from the inverter circuit 3 in addition to the DC power component from the DC power source 5 so that the electric potential at the neutral-point of the three-phase motor 4 is lower than that of the DC power source 5. Therefore, the current flows at the neutral-point of the three-phase motor 4 in the same direction as the discharging direction of the DC power source 5, and the capacitor 2 is charged with the energy from the DC power source 5. In addition, the three-phase motor 4 is driven by the three-phase AC power supplied from the inverter circuit 3 in addition to the DC power component from the DC power source 5 so that the electric potential of the neutral-point of the three-phase motor 4 is higher than that of the DC power source 5. In this case, current flows in the same direction as the charging direction of the DC power source 5 at the neutral-point of the three-phase motor 4, and the DC power source 5 is charged with the energy from the capacitor 2.

The DC to three-phase AC inverter system 1 of the preferred embodiment of the present invention may convert the DC power from the capacitor 2 into the three-phase AC power and supply the three-phase AC power to the three-phase motor 4 while boosting the voltage of the DC power source 5 to charge the capacitor 2. Thus, there is no need to provide a booster circuit or a buck circuit in the DC to three-phase AC inverter system 1 other than the inverter circuit 3, so that the DC to three-phase AC inverter system 1 may be downsized.

The following will describe the control circuit 8 in detail. The control circuit 8 includes a rotational speed calculator 16, a 3-2 axes converter 17, a voltage command generator 18, a comparing element 19 and drive signal generators 20, 21. The cycle of generating drive signals Su, Sv, Sw by the control circuit 8 is substantially equal to or longer than half of cycle of a triangle wave for generating the drive signals Su, Sv, Sw. The rotation angle sensor 6 detects the rotational angle θ of the rotor of the three-phase motor 4. The current sensor 7 detects currents Iu, Iv, Iw flowing through the U-phase, the V-phase and the W-phase of the three-phase motor 4 and current Idc flowing at the neutral-point of the three-phase motor 4. The current sensor 7 may be adapted to detect three of the four currents Iu, Iv, Iw, Idc, and the fourth current may be determined by calculation.

The rotational speed calculator 16 calculates the rotational speed ω of the rotor of the three-phase motor 4 based on the rotational angle θ of the rotor of the three-phase motor 4 and the time of the driving the three-phase motor 4. The 3-2 axes converter 17 converts the currents Iu, Iv, Iw into two current components including current Id flowing in the same direction as that of the magnetic field of the three-phase motor 4 and current Iq flowing in the direction perpendicular to that of the magnetic field of the three-phase motor 4.

The voltage command generator 18 includes a current controller 21 and a 2-3 axes converter 22. The current controller 21 generates voltage commands Vd, Vq based on the rotational speed ω, the currents Id, Iq and a torque command T from an external, such as a control circuit on the upper side of the DC to three-phase AC inverter system 1.

Specifically, using a table storing data representing the relation between current commands Id*, Iq* and the torque command T, the current controller 21 determines the current commands Id*, Iq* from the torque command T.

The current controller 21 determines the difference Δ Id between the current command Id* and the current Id and the difference Δ Iq between the current command Iq* and the current Iq. Then, the current controller 21 determines by propotional-integral (PI) control such voltage commands Vd, Vq that make each value of the differences Δ Id, Δ Iq zero. For example, the voltage commands Vd, Vq are determined according to the Equations 1, 2 below.

$$Vd = Kp \times \Delta Id + \int(Ki = \Delta Id) - \omega LqIq \qquad \text{Equation 1}$$

$$Vq = Kp = \Delta Iq + \int(Ki = \Delta Iq) - \omega LdId + \omega Ke \qquad \text{Equation 2}$$

In the above equations 1 and 2, Kp represents a constant of proportion, Ki represents a constant of integral, Ld represents a d-axis inductance, Lq represents a q-axis inductance, Id represents a d-axis current, Iq represents a q-axis current, and Ke represents a constant of inductive voltage.

The 2-3 axes converter 22 converts the voltage commands Vd, Vq into inverter voltage commands Vu, Vv, Vw for the U-phase, the V-phase and the W-phase, respectively. The comparing element 19 determines voltage commands Vu*, Vv*, Vw* based on a boost command V*, a voltage Vinv of the capacitor 2 and the voltage commands Vu, Vv, Vw. The boost command V* is a value used for making zero the difference between the desired voltage of the capacitor 2 from the external and the measured voltage of the capacitor 2.

FIG. 2 is a flow chart showing the operation of the comparing element 19. At step S1, the comparing element 19 determines whether or not the inverter voltage commands Vu, Vv, Vw are greater than the voltage Vinv.

If NO at step S1, or when the inverter voltage commands Vu, Vv, Vw are not greater than the voltage Vinv of the capacitor 2 (i.e. when the inverter operation is performed through the normal PWM control, or when the PWM control is performed by turning on and off the switching elements for the respective three phases), the comparing element 19 make the boost command V* one-third and then determines at step 2 the voltage commands Vu*, Vv*, Vw* based on the one-third boost command (divided boost command) V* and the voltage commands Vu, Vv, Vw. For example, the comparing element 19 determines the voltage commands Vu*, Vv*, Vw* by adding the one-third boost command V* to the respective voltage commands Vu, Vv, Vw.

If YES at step S1, or when the inverter voltage commands Vu, Vv, Vw are greater than the voltage Vinv (i.e. when the inverter operation is performed through the overmodulation PWM control, or when the PWM control is performed by turning on and off the switching elements for two phases while the switching elements for the other phase continue to be on or off), the comparing element 19 determines at step S3 whether or not the switching element of the U-phase upper or lower arm continues to be on. For example, if the voltage command Vu for the U-phase is greater than the voltage Vinv, the comparing element 19 determines that the switching element of the U-phase upper or lower arm continues to be on.

If YES at step S3, the comparing element 19 makes the boost command V* one-half and then determines at step S4 the voltage commands Vu*, Vv*, Vw* based on the one-half boost command V* serving as a divided boost command and the voltage commands Vu, Vv, Vw. For example, the comparing element 19 determines the voltage commands Vv*, Vw* by adding the one-half boost command V* to the voltage commands Vv, Vw, respectively, and the voltage command Vu* as the voltage command Vu.

Meanwhile, if NO at step S3, the comparing element 19 determines at step S5 whether or not the switching element of the V-phase upper or lower arm continues to be on. For example, if the voltage command Vv for the V-phase is greater than the voltage Vinv, the comparing element 19 determines that the switching element of the V-phase upper or lower arm continues to be on.

If YES at step S5, the comparing element 19 makes the boost command V* one-half and then determines at step S6 the voltage commands Vu*, Vv*, Vw* based on the voltage commands Vu, Vv, Vw and the one-half boost command V* serving as a divided boost command. For example, the comparing element 19 determines the voltage commands Vu*, Vw* by adding the one-half boost command V* to the voltage commands Vu, Vw, respectively, and the voltage command Vv* as voltage command Vv.

If NO at step S5, the comparing element 19 makes the boost command V* one-half and then determines at step S7 the voltage commands Vu*, Vv*, Vw* based on the voltage commands Vu, Vv, Vw and the one-half boost command V* serving as a divided boost command. For example, the comparing element 19 determines the voltage commands Vu*, Vv* by adding the one-half boost command V* to the voltage commands Vu and Vv, respectively, and the voltage command Vw* as the voltage commands Vw.

The inverter operation is performed through the overmodulation PWM control, the halved voltage command V* is added to the voltage command for the phases other than the phase in which the switching element of the upper or lower arm continues to be on. Thus, the inverter operation is performed through the overmodulation PWM control, the voltage of the capacitor 2 is maintained at a predetermined value while driving the three-phase motor 4.

Comparing one of the voltage command Vu*, Vv*, Vw* from the comparing element 19 with the triangle wave, the drive signal generator 20 shown in FIG. 1 generates drive signals Su, Sv, Sw serving as first through third drive signals for the respective phases. For example, the drive signal generator 20 generates a drive signal of a high level when the voltage command Vu* is greater than the triangle wave and a drive signal of a low level when the voltage command Vu* is smaller than the triangle wave as the drive signal Su. Additionally, the drive signal generator 20 generates a drive signal of a high level when the voltage command Vv* is greater than the triangle wave and a drive signal of a low level when the voltage command Vv* is smaller than the triangle wave as the drive signal Sv. Furthermore, the drive signal generator 20 generates a drive signal of a high level when the voltage command Vw* is greater than the triangle wave and a drive signal of a low level when the voltage command Vw* is smaller than the triangle wave as the drive signal Sw.

The drive circuit 9 generates to the switching elements 10 through 15 drive signals S1 through S6 by using the drive signals Su, Sv and Sw, respectively. For example, the drive circuit 9 generates to the switching element 10 the drive signal Su as the drive signal S1 and to the switching element 11 a drive signal produced by inverting the drive signal Su as the drive signal S2. The drive circuit 9 generates to the switching element 12 the drive signal Sv as the drive signal S3 and to the switching element 13 a drive signal produced by inverting the drive signal Sv as the drive signal S4. The drive circuit 9 generates to the switching element 14 the drive signal Sw as the drive signal S5 and to the switching element 15 a drive signal produced by inverting the drive signal Sw as the drive signal S6.

According to the DC to three-phase AC inverter system 1 of the preferred embodiment of the present invention, while the drive signals Su, Sv, Sw are generated for driving the three-phase motor 4 when the inverter operation is performed through the overmodulation PWM control, the voltage of the capacitor 2 is added to the drive signal for the phases other than the phase in which the switching element continues to be on, thereby maintaining the voltage of the capacitor 2 at the predetermined value. Thus, if the inverter operation is performed through the overmodulation PWM control, the voltage of the capacitor 2 is set to the desired value for driving the three-phase motor 4. Therefore, the operating range of the three-phase motor 4 is prevented from being restricted. The distortion of the current flowing through the three-phase motor 4 when the inverter operation is performed through the overmodulation PWM control may be reduced, so that torque ripple or zero-phase current ripple (or ripple of current flowing through the neutral-point of the three-phase motor 4) may be reduced.

In the DC to three-phase AC inverter system according to the preferred embodiment of the present invention, the DC source 5 is arranged between the neutral-point of the three-phase motor 4 and the lower arms of the switching elements 11, 13, 15 of the inverter circuit 3. Alternatively, the DC source 5 may be arranged between the neutral-point of the three-phase motor 4 and the upper arms of the switching elements 10, 12, 14 of the inverter circuit 3. In this structure, the control circuit 8 controls the switching operation of the switching elements 10 through 15 such that the current flowing at the neutral-point of the three-phase motor 4 is offset to the positive.

What is claimed is:

1. A direct-current to three-phase alternating-current inverter system comprising:
   a three-phase motor having first through third phases;
   an inverter circuit for the three-phase motor;
   a plurality of switching elements arranged in the inverter circuit, each switching element performing switching operation, the switching elements respectively serving as upper arms and lower arms for the respective three phases of the three-phase motor;
   a capacitor connected in parallel to the respective pairs of the upper arm and the lower arm;
   a direct-current power source arranged between the neutral-point of the three-phase motor and the respective upper arms or the respective lower arms; and
   a control circuit calculating i) voltage commands for driving the three-phase motor, ii) first through third divided boost commands by dividing a boost command for making voltage of the capacitor by a predetermined value corresponding to the first through third divided boost commands, respectively, and iii) first through third drive signals based on the voltage commands and the first through third divided boost commands for controlling the switching operation of the switching elements for the first through third phases,
   wherein the second and third divided boost commands used when the pulse width modulation control is performed by turning on and off the switching elements for the second and third phases while the switching elements for the first phase continues to be on or off is set larger than the second and third divided boost commands used when the pulse width modulation control is performed by turning on and off the switching elements for the first through third phases.

2. The direct current to three-phase alternating-current inverter system according to claim 1, wherein the second and third divided boost commands used when the pulse width modulation control is performed by turning on and off the switching elements for the second and third phases while the switching elements for the first phase continues to be on or off state is set equal to one-half of the boost command, and the first through third divided boost commands used when the pulse width modulation control is performed by turning on and off the switching elements for the first through third phases is set equal to one-third of the boost command.

* * * * *